US010795878B2

(12) United States Patent
Allen et al.

(10) Patent No.: US 10,795,878 B2
(45) Date of Patent: Oct. 6, 2020

(54) SYSTEM AND METHOD FOR IDENTIFYING ANSWER KEY PROBLEMS IN A NATURAL LANGUAGE QUESTION AND ANSWERING SYSTEM

(71) Applicant: International Business Machines Corporation, Armonk, NY (US)

(72) Inventors: Corville O. Allen, Morrisville, NC (US); Anne E. Gattiker, Austin, TX (US); Anita Govindjee, Ithaca, NY (US); Lakshminarayanan Krishnamurthy, Round Rock, TX (US); Joseph N. Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 14/921,401

(22) Filed: Oct. 23, 2015

(65) Prior Publication Data
US 2017/0116250 A1 Apr. 27, 2017

(51) Int. Cl.
| | |
|---|---|
| *G06F 7/00* | (2006.01) |
| *G06F 16/23* | (2019.01) |
| *G06N 20/00* | (2019.01) |
| *G06F 16/951* | (2019.01) |
| *G06F 16/2457* | (2019.01) |
| *G06F 16/242* | (2019.01) |
| *G06N 5/02* | (2006.01) |

(Continued)

(52) U.S. Cl.
CPC ........ *G06F 16/2365* (2019.01); *G06F 16/243* (2019.01); *G06F 16/24578* (2019.01); *G06F 16/951* (2019.01); *G06F 40/40* (2020.01); *G06N 5/022* (2013.01); *G06N 5/04* (2013.01); *G06N 20/00* (2019.01)

(58) Field of Classification Search
CPC .................................................. G06F 16/2365
See application file for complete search history.

(56) References Cited

U.S. PATENT DOCUMENTS

| | | | |
|---|---|---|---|
| 7,966,316 B2 | 6/2011 | Cao et al. | |
| 8,738,617 B2 * | 5/2014 | Brown | F16H 1/28 |
| | | | 707/731 |

(Continued)

FOREIGN PATENT DOCUMENTS

CN 102495860 A 6/2012

OTHER PUBLICATIONS

R. High, "The Era of Cognitive Systems: An Inside Look at IBM Watson and How it Works," IBM Redbooks, 2012.

(Continued)

*Primary Examiner* — Eliyah S. Harper
(74) *Attorney, Agent, or Firm* — Terrile, Cannatti & Chambers, LLP; Michael Rocco Cannatti

(57) ABSTRACT

A system and a computer program product are provided for evaluating question-answer pairs in an answer key by comparing a first answer key answer to a plurality of candidate answers to determine if the answer key may have a problem if the plurality of candidate answers are more similar to one another than to the first answer and to determine if the plurality of candidate answers has gradient information which may be used to update the answer key if not already included in the answer key.

20 Claims, 3 Drawing Sheets

(51) Int. Cl.
*G06N 5/04* (2006.01)
*G06F 40/40* (2020.01)

(56) References Cited

U.S. PATENT DOCUMENTS

| | | | |
|---|---|---|---|
| 8,959,043 B2 | 2/2015 | Ferrucci et al. | |
| 9,063,975 B2* | 6/2015 | Isensee | G06F 16/2455 |
| 9,336,485 B2* | 5/2016 | Haggar | G06F 16/3344 |
| 9,471,689 B2* | 10/2016 | Allen | G06F 16/9535 |
| 9,619,513 B2 | 4/2017 | Bradley et al. | |
| 10,248,689 B2* | 4/2019 | Brennan | G06F 16/24522 |
| 10,628,413 B2* | 4/2020 | Bishop | G06F 16/24526 |
| 10,628,521 B2* | 4/2020 | Bishop | G06F 16/24522 |
| 2006/0206481 A1* | 9/2006 | Ohkuma | G06F 17/30654 |
| 2009/0259642 A1* | 10/2009 | Cao | G06F 16/345 |
| 2012/0077178 A1 | 3/2012 | Bagchi et al. | |
| 2013/0097178 A1* | 4/2013 | Song | G06Q 50/10 |
| | | | 707/748 |
| 2013/0304730 A1* | 11/2013 | Zhou | G06Q 30/02 |
| | | | 707/723 |
| 2014/0201217 A1* | 7/2014 | Hatami-Hanza | G06F 16/367 |
| | | | 707/748 |
| 2015/0170057 A1 | 6/2015 | Allen | |
| 2015/0179082 A1 | 6/2015 | Byron | |
| 2016/0034457 A1 | 2/2016 | Bradley | |
| 2016/0179862 A1 | 6/2016 | Allen et al. | |
| 2016/0293034 A1* | 10/2016 | Agarwalla | G09B 7/06 |
| 2017/0004204 A1 | 1/2017 | Bastide et al. | |

OTHER PUBLICATIONS

Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
Eric Brill et al., An Analysis of the AskMSR Question-Answering System, Jan. 1, 2002 http://susandumais.com/emnlp_final.pdf.

* cited by examiner

SYSTEM AND METHOD FOR IDENTIFYING ANSWER KEY PROBLEMS IN A NATURAL LANGUAGE QUESTION AND ANSWERING SYSTEM

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. To train such QA systems, users may generate question-answer (QA) pairs, also known as answer keys, from fact statements for submission to the QA system, but answers and/or questions in the training QA pairs can be incorrect or inaccurate, particularly when a QA pair or answer key is built dynamically or provided by the customer. The time and resources needed to conduct the fact checking needed to verify and correct training QA pairs is large and also error prone due to the manual operation of the fact checking. Such inaccuracies, if not corrected with cumbersome and time intensive answer correction processing tasks, can result in answer-key problems—such as semantically correct answers missing from the answer key, syntactically correct answers missing from the answer key, and/or inadequate QA pairs which in turn impair the accuracy of the QA system. As a result, the existing solutions for efficiently generating and verifying accurate question and/or answer keys for training QA pairs are extremely difficult at a practical level.

SUMMARY

Broadly speaking, selected embodiments of the present disclosure provide a system, method, and apparatus for identifying question and/or answer key problems by using the cognitive power of the information handling system to compare an answer key answer for a first question to one or more returned answers generated by a question answering (QA) system in response to the first question to determine if there is a problem with the answer key answer. To compare the answer key answer to the returned answers, the information handling system computes the similarity of the returned answers to one another in terms of specified similarity metric values, and then identifies one or more top ranked returned answers having corresponding similarity metric values. In addition, the information handling system computes the similarity of the returned answers to the answer key answer in terms of specified similarity metric values, and then identifies a maximum similarity metric value for the answer key. If the maximum similarity metric value for the answer key answer is less than the similarity metric value(s) corresponding to the one or more top ranked returned answers from the QA system, this indicates there may be a problem with the answer key and/or that the returned answer(s) may be equivalent or acceptable for inclusion in the answer key. Based on analysis, the returned answer(s) may be highlighted to the user for use in augmenting the answer key as another correct answer, or alternatively as an incorrect answer. In selected embodiments, the answer key may be augmented by updating the answer key answer with a grading value or other gradient characteristic contained in the returned answer(s) from the QA system. In other embodiments, a system, method, and apparatus for identifying question and/or answer key problems by using a first answer in the answer key to generate questions on the first answer which are then compared to the original question in the answer key corresponding to the first answer on the basis of comparative similarity metric values, thereby validating the first question-answer pair if the similarity metric values are similar or alternatively identifying a potential answer key problem if the similarity metric values are not similar. In this way, the domain expert or system knowledge expert can review and evaluate proposed updates to the answer key based on returned answers having equivalent or overlapping similarity metric values.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
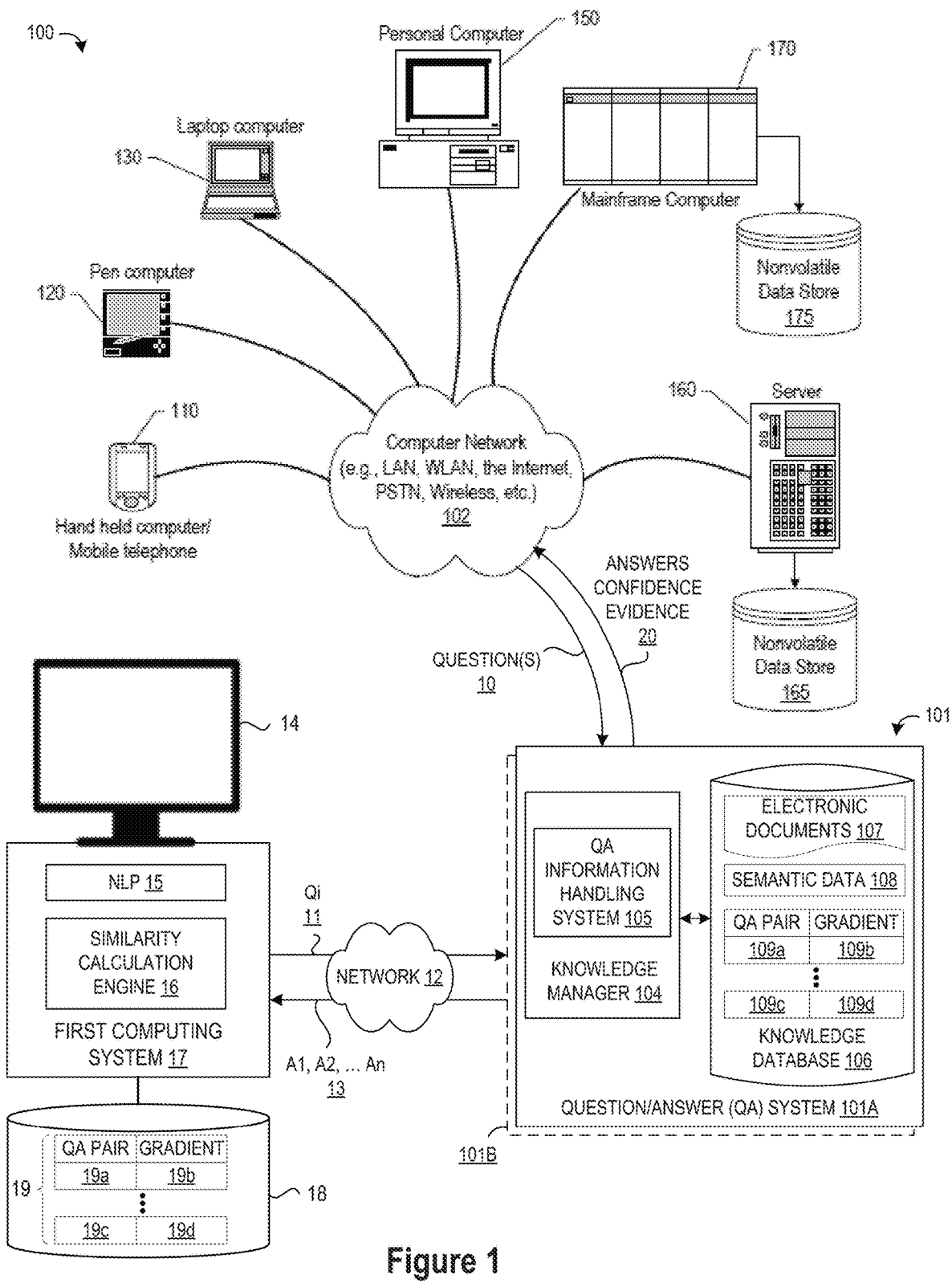
FIG. 1 depicts a system diagram that includes a QA system connected in a network environment to a computing system that uses a similarity calculation engine to identify and correct answer key problems.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing more accurate training QA pairs.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram 100 of one illustrative embodiment of a question/answer (QA) system 101 connected across a computer network 12 to a first computing system 17 that uses a similarity calculation engine 16 to identify and correct answer key problems. The QA system 101 may include one or more QA system pipelines 101A, 101B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like in this networked arrangement, the QA system 101 and network 102 may enable question/answer (QA) generation functionality for one or more content users. Other embodiments of QA system 101 may be used with components, systems, sub-systems, and/or devices other than those that are depicted herein.

In the QA system 101, the knowledge manager 104 may be configured to receive inputs from various sources. For example, knowledge manager 104 may receive input from the network 102, one or more knowledge bases or corpora 106 of electronic documents 107, semantic data 108, or other data, content users, and other possible sources of input. In selected embodiments, the knowledge base 106 my include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in an electronic document 107 for use as part of a corpora 106 of data with knowledge manager 104. The corpora 106 may include any structured and unstructured documents, including but not limited to any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 101 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 101 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 101 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In addition to providing answers to questions, QA system 101 is connected to a first computing system 17 which identifies and corrects answer key problems in a QA pair list 19 which may be used to train the QA system 101. Though shown as being connected across a network 12, the QA system 101 may be directly connected to the first computing system 17 or indirectly connected via the computer network 102. Alternatively, the functionality described herein with reference to the first computing system 17 may be embodied in or integrated with the QA system 101. To train the QA system 101, the first computing system 17 may be configured to store the QA pair list 19 of question-answer pairs (e.g., 19a, 19c) in a database 18, alone or in combination with associated gradient or grading characteristic information (e.g., 19b, 19d). However, the answers and/or question in the QA pair list 19 can be incorrect or inaccurate when initially prepared or due to the passage of time (e.g., when the question or answer information becomes stale). To ensure the accuracy of the QA pair list 19, the first computing system 17 may be configured to determine a confidence value of an answer in each question and answer pair set (e.g., 19a) as compared to one or more answers generated by the QA system 101. In selected embodiments, the confidence measure is determined by using a similarity calculation engine 16 to calculate a similarity between (1) a first answer key answer from the QA pair list (e.g., 19a) and (2) one or more answers 13 generated and returned by the QA system in To obtain the one or more answers 13, the first computing system 17 may be configured to process each question-answer pair (e.g., 19a, 19c) by passing each question Qi 11 to the QA system 101. In response to a received question Qi 11, the knowledge manager 104 and/or QA information handling system 105 generates answers A1, A2, . . . An 13 which are sent back to the first computing system 17. To compare the first answer key answer from the QA pair list (e.g., 19a) to the returned answer(s) 13, the similarity calculation engine 17 may use natural language processing (NLP) or any known similarity calculation engine (e.g., Alchemy API™) to determine the similarity level between the first answer key answer 19a and the returned answer(s) 13 for purposes of determining whether the first answer key answer is correct or requires updating with information from the returned answer(s) 13. For example, the similarity calculation engine 17 may use natural language (NL) processing to compare the first answer key answer to the returned answers 13 by first computing the similarity of the returned answers to one another one in terms of specified similarity metric values $W_{12}$, $W_{13}$, . . . $W_{mn}$, and then using the computed similarity metric values to identify j top ranked returned answers having corresponding similarity metric values. In addition, the similarity calculation engine 17 computes the similarity of the returned answers 13 to the first answer key answer in terms of specified similarity metric values $W_{AK,1}$, $W_{AK,2}$, . . . $W_{AK,N}$, and then identifies a maximum similarity metric value for the answer key answer $W_{AK, MAX}$. If the maximum similarity metric value for the answer key answer is less than the similarity metric value(s) corresponding to the one or more top ranked returned answers from the QA system 101, then the similarity calculation engine 17 indicates there may be a problem with the first answer key answer and/or that the returned answer(s) 13 may be equivalent or acceptable for inclusion in the first answer key answer. Based on analysis, the returned answer(s) 13 may be highlighted to the user at display 14 for use in augmenting the first answer key answer 19a as another, correct answer, or alternatively as an incorrect answer. In selected embodiments, the first answer key answer 19a may be augmented by updating the gradient portion of the first answer key answer with a grading value or other gradient characteristic (e.g., 19b) contained in the returned answer(s) (e.g., 109a, 109b) from the QA system 101. In this way, the domain expert or system knowledge expert can review and evaluate proposed updates to the answer key based on returned answers having equivalent or overlapping similarity metric values.

Though not shown, selected embodiments of first computing system 17 may also be configured to identify question and/or answer key problems by using a first answer in the answer key an answer in the QA pair 19c) to generate questions on the first answer at the QA system 101. Once the questions are returned to the first computing system 17, the similarity calculation engine 17 compares the returned questions to the original question in the answer key corresponding to the first answer on the basis of comparative similarity metric values, thereby validating the first question-answer pair if the similarity metric values are similar or alternatively identifying a potential answer key problem if the similarity metric values are not similar.

Types of information handling systems that can utilize QA system 101 range from small handheld devices, such as handheld computer/mobile telephone 110 to large mainframe systems, such as mainframe computer 170, Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
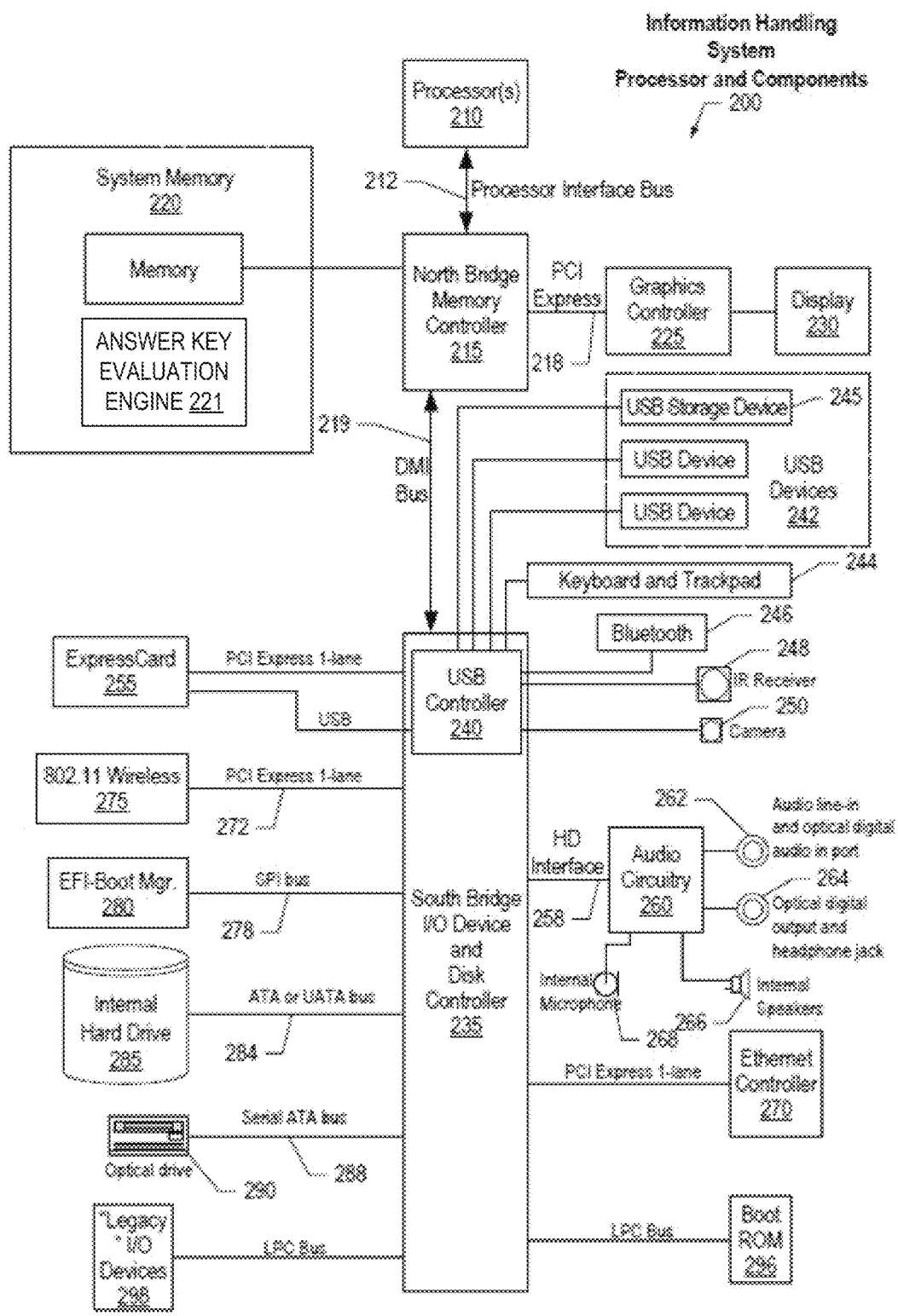
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including an answer key evaluation engine module 221 which may be invoked to compare one or more answers, passages and sentences returned from a computing system (e.g., an IBM Watson™ QA system) to specified answers in the answer key using a semantic analysis, and then to update or correct the answers in the answer key if the returned answers are semantically related to each other and are not related to the answer in the answer key, such as by inserting qualifier, grade, or gradient information from a returned answer into the answer key. Graphics controller MMS also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DIM) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware interface (EFT) manager 280 connects to Southbridge 235 via Serial Peripheral Interface (SPI) bus 278 and is used to interface between an operating system and platform firmware, Optical storage device 290 connects to Southbridge 235 using Serial ATA (SATA) bus 288, Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
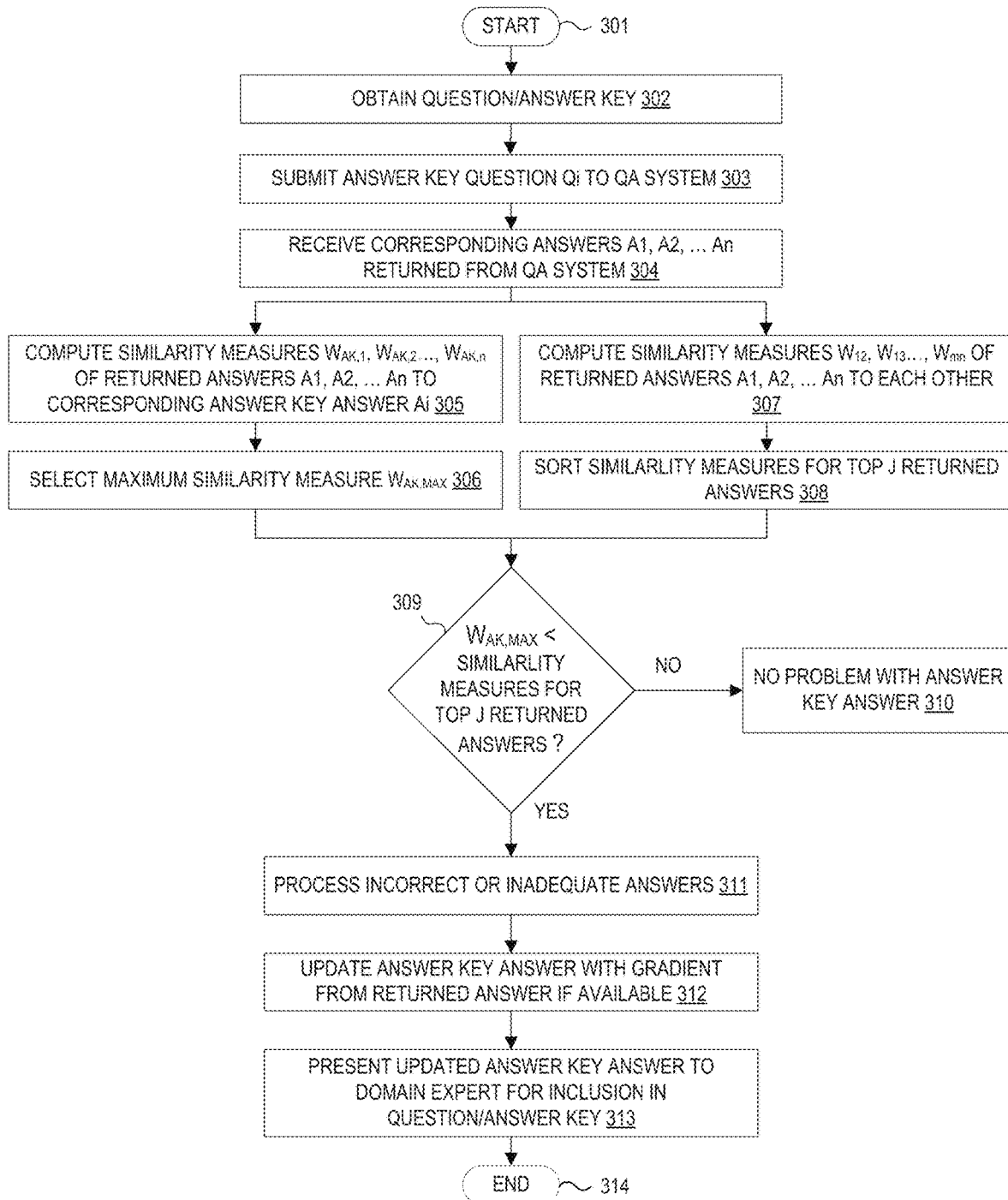
FIG. 3 illustrates a simplified flow chart showing the logic for identifying and correcting answer key problems by determining similarity levels between the answer key answer and answers returned from the QA system and updating the answer key with gradient characteristics included in the answers returned from the QA system.

FIG. 3 depicts an approach that can be executed on an information handling system to identify and correct answer key problems by determining similarity levels between the answer key answer and answers returned from the QA system, such as QA system 101 shown in FIG. 1, and updating the answer key answer with gradient characteristics included in the answers returned from the QA system. This approach can be included within the QA system 101 or provided as a separate computing system, method, or module. Wherever implemented, the disclosed answer key evaluation scheme identifies answer key problems in question-answer pairs by comparing a returned answer from a QA system to an answer in the answer key to find other correct answers. The comparison processing may include determining a similarity level between the answer key answer and the returned answers, indicating if the answer key answer is correct or incorrect based on the similarity level, and updating the answer key with gradient characteristic information extracted from the returned answer(s) if the gradient characteristic information is not included in the answer key. With the disclosed answer key evaluation scheme, an information handling system can be configured to identify and correct answer key problems in a training set of QA pairs, thereby improving the accuracy of training for the QA system.

To provide additional details for an improved understanding of selected embodiments of the present disclosure, reference is now made to FIG. 3 which depicts a simplified flow chart 300 showing the logic for identifying and correcting answer key problems by determining similarity levels between the answer key answer and answers returned from the QA system and updating the answer key with gradient characteristics included in the answers returned from the QA system. The processing shown in FIG. 3 may be performed by a cognitive system, such as the first computing system 17, QA system 101, or other natural language question answering system, FIG. 3 processing commences at 301 whereupon, at step 302, a question/answer key is obtained. For example, a previously generated answer key may be retrieved from memory storage, or a received statement may be decomposed into one or more sets of questions and answer pairs, such as the QA pair list 19 stored in a database 18, alone or in combination with associated gradient or grading characteristic information. The processing at step 302 may be performed at the first computing system 17, the QA system 101 or other NIT question answering system. In selected embodiments, a received statement may be decomposed by a natural language processor 15 in the first computing system 17 which is configured to identify at least one clause in the received statement, and is configured to separate the received statement according to the identified at least one clause. As will be appreciated, decomposing a statement is a process which takes a given statement as a "complex" fact and identifies at least one clause within the statement. As described herein, a Natural Language Processing (NLP) routine may be used to process the received questions and/or generate a computed answer with associated evidence and confidence measures, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. In selected embodiments, the natural language processor 15 is configured to decompose the received statement, e.g., by performing one or more of (1) identifying syntactic labels (e.g., "this," "that," etc.) in the received statement in which the syntactic labels are indicators for breaking a statement into two or more statements; (2) identifying a conjunction(s) (e.g., "and," "but," etc.) that connects two parallel statements; (3) identifying configuration information of the received statement that includes, but is not limited to: (a) a syntactic contour that shows a main clause and a subordinate clause characterize a same entity, and (b) indicative of a nested statement that focuses on one of several underspecified entities which do not share their facts; (4) identifying pre-modifiers (e.g., an adjective(s) in front of a named entity) and/or post-modifiers (e.g., an adjective(s) behind of a named entity) in the received statement which separate the received statement into one element and a statement; (5) identifying relative qualifiers (e.g., "the first," "only," "the westernmost," etc.) which need to be completed by information from elsewhere. The natural language processor 15 is configured to separate the received statement according to one or more of: the identified at least one clause, the identified at least one syntactic label, the identified at least one conjunction, the identified configuration information, the identified at least one pre-modifier or post-modifier, and the identified at least one relative qualifier.

At step 303, the evaluation processing of each answer Ai in the QA key begins by submitting the corresponding question Qi from the QA key to a computing system. For example, a first computing system (e.g., computing system 17) may send the corresponding questions of the question and answer pair sets, e.g., via a network (e.g., a network 12 including, but not limited to Intranet, Internet, Wireless communication network, Wired communication network, Satellite communication network, etc.) to a second computing system. The second computing system can process a natural language text and can provide answers to questions expressed in natural language. The second computing system may be embodied, but is not limited to, an artificial intelligent computer, Watson™ computer (trademark of International Business Machine, Inc. Armonk, N.Y.), etc. In selected embodiments, the first computing system and the second computing system are two different computing systems. In other embodiments, the first computing system and the second computing system are a single computing system. An artificial intelligent computer refers to an intelligent computing system adapted to perform a question answering (QA), natural language processing, data retrieval, logical reasoning, machine learning, etc.

At step 304, after processing the corresponding question(s) Qi at the computing system (e.g., QA system 101), one or more candidate responses or answers to the questions (e.g., A1, A2, . . . An) are received. For each question Qi with corresponding answer Ai provided in the answer key, the method 300 passes the question Qi to the QA system and obtains back a corresponding set of answers A1, . . . , An.

Upon receiving the returned answers generated in response to a question Qi from the QA key, they are compared to each other and to the corresponding answer Ai in the QA key answer using any desired comparison metric, including but not limited to ngram1, ngram2, entropy, word overlap, etc. In selected embodiments, the comparison processing may be performed at the first computing system (e.g., 17) using two sets of computational processing steps 305-308 which proceed in parallel or in sequence.

In a first example embodiment, the methodology 300 computes the similarity of the returned answers to the answer key answer at step 305. In selected embodiments, the similarity is computed by the first computing system 17 which applies a semantic or similarity analysis of the answer texts to compute a first similarity metric $W_{AK,1}$ as a measure of the similarity of the answer key answer Ai (or $A_{AK}$) to the first returned answer A1, a second similarity metric $W_{AK,2}$ as a measure of the similarity of the answer key answer Ai to the second returned answer A2, and so on until the final similarity metric $W_{AK,n}$ is computed for the similarity of the answer key answer Ai to the final returned answer An. From the computed similarity metrics $W_{AK,1}$-$W_{AK,n}$ corresponding to the selected answer key answer Ai, the maximum similarity metric is selected at step 306 by computing $W_{AK,MAX}$=max($W_{AK,1}$, $W_{AK,2}$ . . . , $W_{AK,n}$), though any desired maximization selection algorithm may be used.

In another example embodiment, the similarity of the returned answers to answer key answer is computed at step 305 using sentence similarity techniques to find similar answers from the returned answers. For example, the first computing system 17 may be configured to find, in the returned answers, sentences or passages for answers where the answers form a "list," Each listed answer may then be cross checked against the answer key. If the listed answer is not found in the answer key, then the answer may be denoted as a similar answer for possible inclusion in the answer key. For example, if answer key includes a question "What is the color of our ID badge" and includes only the answer "Red," and the returned answers include "Orange, Green, Red" as a list of answers in the sentence, then the processing at step 305 may highlight or identify "Orange" and "Green" set of potential options to solve the question, Each of the options are an answer to the question which may be parsed and denoted as acceptable answers and cross checked for similarity and highlighting.

In sequence or in parallel, the methodology 300 computes the similarity of the returned answers to one another at step 307, such as by having by the first computing system 17 apply a semantic or similarity analysis of the answer texts to compute a first similarity metric $W_{1,2}$ as a measure of the similarity of the first returned answer A1 to the second returned answer A2, a second similarity metric $W_{1,3}$ as a measure of the similarity of the first returned answer A1 to the third returned answer A3, and so on until the final similarity metric $W_{m,n}$ is computed for the similarity of the mth returned answer Am to the nth returned answer An. The computed similarity metrics $W_{1,2}$-$W_{m,n}$ for the returned answers are then sorted and ranked at step 308 by to select the top j returned answers, where j≥1.

At step 309, the similarity metric values are processed to compare the sorted similarity metrics for the to j returned answers (generated at step 308) to the maximum similarity metric $W_{AK,MAX}$ (generated at step 306). The processing at step 309 may be performed at the first computing system (e.g., 17) or the QA system 100 using any processing routine, such as a Natural Language Processing (NLP) routine processing, which is capable of comparing the computed similarity metric values. If the processing at step 309 determines that the maximum similarity metric $W_{AK,MAX}$ is not less than the similarity measures for the top j returned answers (negative answer to step 309), then the methodology 300 reports that there is no problem with the answer key in respect of the selected answer (step 310).

Alternatively, a negative outcome to decision step 309 may indicate that a returned answer is equivalent or acceptable in terms of overlapping in similarity with the answer key answer, in which case the returned answer may be highlighted to the user for use in augmenting the answer key with another correct answer based.

If, however, the processing at step 309 determines that the maximum similarity metric $W_{AK,MAX}$ is less than the similarity measures for the top j returned answers (affirmative answer to step 309), then the methodology 300 processes the incorrect or inadequate answer at step 311, such as by reporting that there is a problem with answer key. In addition or in the alternative, the processing at step 311 may include additional computational processing on the incorrect or inadequate answers. For example, the first computing system (e.g., 17) or the QA system 100 may perform a sentence similarity check against the incoming question and the question in the QA pair to determine if they are sufficiently similar. In addition, the sentence may be checked for direct negation against the answer(s) found in the QA pair. If a negation against the given answer is detected and the answer in the QA pair, then the answer key answer may be flagged as being problematic and/or an incorrect answer option may be inserted in the answer key answer.

To illustrate selected embodiments of the present disclosure, a first exemplary answer key (such as provided at step 302) may include the following question, sources, and answer:

Question: What symptoms should I expect when I have diabetes? Answer: www.diabetes.org: Diabetes Basics: Gestational Diabetes Women with gestational diabetes often have no symptoms, which is why its important for at-risk women to be tested at the proper time during pregnancy.

After submission of the answer key question to the QA system at step 303, the following answers are received:

Answer1
www.diabetes.org Diabetes Basics: SymptornsCommon symptoms of diabetes: Urinating often, Feeling very thirsty, Feeling very hungry—even though you are eating, Extreme fatigue, Blurry vision, Cuts/bruises that are slow to heal, Weight loss—even though you are eating more (type 1), Tingling, pain, or numbness in the hands/feet (type 2)

Answer2
www.webmd.com: Diabetes: Understanding Diabetes Symptoms People with type 2 diabetes often do not have any symptoms. When symptoms do occur, they are often ignored because they may not seem serious. Symptoms in type 1 diabetes usually come on much more suddenly and are often severe. Common symptoms of diabetes include: Excessive thirst and appetite, Increased urination (sometimes as often as every hour) Unusual weight loss or gain; Fatigue; Nausea, perhaps vomiting; Blurred vision; In women, frequent vaginal infections; in men and women, yeast infections; Dry mouth; Slow-healing sores or cut; Itching skin, especially in the groin or vaginal area.

At step 307, the first similarity metric values between the returned answers (Answer 1, Answer2) may be computed, such as by determining the number of shared words between Answer1 and Answer2=16=$W_{1,2}$. In similar fashion, the second similarity metric values between the returned answers (Answer1, Answer2) and the answer key answer may be computed at step 305. In this example, the second similarity metric values may be computed as the number of shared words between the answer key answer and Answer1=5=$W_{AK,1}$, and as the number of shared words between the answer key answer and Answer2=7=$W_{AK,2}$. Once the maximum of the second similarity metric values $W_{AK,MAX}$=7 is identified (from step 306) and the first similarity metric values are sorted (from step 308), a comparison of the maximum second similarity metric value to the sorted first similarity metric values confirms that $W_{AK,MAX}<W_{1,2}$, in which case the answer key answer is flagged or otherwise identified as including a potential problem or inaccuracy.

At step 312, an inadequate answer may be further processed by checking the returned answer(s) and the QA pair answer key answer for grades, qualifiers, or other gradient characteristics that may be added to the answer key answer. Generally speaking, an answer contains a grade, qualifier, or gradient characteristic when it specifies a ">" or "<" relationship or otherwise sets forth numerical specificity or detail. The processing at step 312 may be performed at the first computing system 17 or the QA system 100 by identifying qualifier, gradient or grading characteristic information in any of the returned answers, and then determining if QA pair answer key answer contains the gradient or grading characteristic information. If the QA pair answer key answer does not contain the gradient/grading characteristic information, then an alert may be issued that an inadequate answer is given and the gradient/grading characteristic information from the returned answer may be inserted into the answer key answer. In selected embodiments, the processing at step 312 may include performing sentence similarity checking of the returned answers to the answer key question/answer pair to identify qualifier terms (e.g., more, most, longest, and the like) in the returned answers. In selected embodiments, qualifiers can be identified by their existence on keyword matches to the sentences. In addition or in the alternative, the returned answers may be checked for grades for ranges of values with the object/subject (parts of speech) in the sentence. In addition or in the alternative, the returned answers may be checked for gradient usage terms relating to mathematical ranges (e.g., >, <, ≥, ≤, etc.) associated with a term. In selected embodiments, grades or gradients can be found by looking at the way values are expressed for terms in the corpora and creating a map or identifying a term as unit of measure in the domain. As will be appreciated, any desired NL processing technique may be used to identify gradients, grading and qualifiers in the sentences, including but not limited to (a) term checking the terms, or checking against a data store of key terms or (b) performing pattern matching for gradient identifier terms (e.g., >, =) which are then marked (e.g., "Temperature>102"), Once the match in the sentence is confirmed, the identified gradient/grading/qualifier term is compared to the answer key to determine if the identified term is present. If not, the answer key may be marked as ambiguous or incorrect. In addition, the answer key may be corrected by inserting the identified grade/gradient/qualifier term into the question and answer pair to augment or correct the answer or identify the answer. For example, an answer key may be corrected by inserting the identified (qualifier, grade, gradient) terms as changes in the required sentence or location of the answer key. Alternatively, a new entry may be created in the answer key for a more specific question and answer based on the identified (qualifier, grade, gradient) terms.

At step 313, the updated answer key may be presented which provides the correct answer by including the identified (qualifier, grade, gradient) terms. Alternatively, an indication may be provided that there is a need to correct the answer key. In either case, the domain expert may evaluate the answer key information for possible inclusion in the question/answer key. In this way, the processing of returned answers to identify qualifier, grade, or gradient terms may be used to identify and correct ambiguities in answer keys.

To illustrate selected embodiments of the present disclosure, reference is now made to a medical domain example where questions relating to "vomiting" or "fever" may have explicit values that require more accuracy in the answer. For example, questions about high body temperature may indicate a range that is needed, and a grade value for the severity of an adverse effect (vomiting) is important in an answer. An example of an answer with gradient or grading is the following:

Q. "Does the patient have a fever?"
A. "High Body Temperature" Grading "Temperature>102".

In this example, the gradient illustrates a correctness or adequacy of the answer. However, an example of an inadequate answer would be:

Q. "When should a patient be given an immunotherapy?"
A. "A patient has vomiting."

In this example, the answer is inadequate. An example of an adequate answer would be "A patient has a grade 3 or 4 vomiting,"

After using the answer key evaluation process 300 to identify and correct answer key problems, the process ends at step 314, at which point the answer key evaluation process 300 may await reactivation by the domain expert or according to a predetermined or periodic activation schedule.

Selected embodiments of the present disclosure are described with reference to evaluating answer key answers in terms of computed similarity metric values for a plurality of generated answers returned by a QA system. However, it will be appreciated that the present disclosure may be also be applied to evaluate answer key questions in terms of computed similarity metric values for a plurality of generated questions returned by a question-answer system. In such embodiments, an answer that is selected from answer key is used to run question generation on that answer, such as by submitting the answer to the question-answer system which generates and returns questions. By comparing the generated question(s) to the originally-asked question in terms of computed similarity metric values, similar questions are identified to indicate that the question-answer pair in the answer key is reasonable. However, if the computed similarity metric values are not similar, the question-answer pair in the answer key is flagged as potentially including an answer key problem.

By now, it will be appreciated that there is disclosed herein a system, method, apparatus, and computer program product for evaluating question-answer pairs in an answer key at a first information handling system having a processor and a memory. As disclosed, the system, method, apparatus, and computer program product select a first answer from the answer key. At the first information handling system, the first answer is compared to a plurality of candidate answers generated in response to a first question corresponding to the first answer in the answer key. In selected embodiments, the candidate answers are generated by sending the first question to a second information handling system capable of answering questions, which in turn generates candidate answers in response to the first question for return and receipt at the first information handling system. In selected embodiments, the first answer is compared to the candidate answers by performing a similarity analysis of the first answer and each candidate answer, computing a plurality of first similarity metric values between said first answer and a respective candidate answer, and then identifying a maximum similarity metric value from the plurality of first similarity metric values. The comparison of the first answer to the plurality of candidate answers may include applying a lexical, syntactic, semantic, entropy, or ngram, similarity metric. The comparison processing may also include performing a semantic analysis of each of the plurality of candidate answers, and computing a second similarity metric value for each pair of candidate answers quantifying said pair of candidate answers. The comparison of the plurality of candidate answers may include applying a lexical, syntactic, semantic, entropy, or ngram similarity metric. In this way, a comparison of one or more of the second similarity metric values to the maximum similarity metric value may be used to identify a problem with the answer key if the maximum similarity metric value is less than the one or more of the second similarity metric values. In addition, the first information handling system determines if the plurality of candidate answers has gradient information. In the absence of gradient information in the answer key, the first information handling system updates the answer key with the gradient information extracted from the candidate answers. In addition, the first information handling system may present an indication (e.g., on a display) that the answer key may have a problem if comparing the first answer to the plurality of candidate answers indicates that the plurality of candidate answers are more similar to another than to the first answer. In selected embodiments, the first and second information handling systems are embodied in one or more natural language processing (NLP) computer systems for running a search engine or querying a database with the first question to generate the plurality of candidate answers.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of evaluating question-answer pairs in an answer key, the method comprising:
   selecting, by a first information handling system comprising a processor and a memory, a first answer from the answer key;
   comparing, by the first information handling system, the first answer to a plurality of candidate answers generated in response to a first question corresponding to the first answer in the answer key by using a semantic analysis to determine if the plurality of candidate answers are semantically related to each other and are not related to the first answer from the answer key; and presenting, by the first information handling system, an indication that the answer key may have a problem if comparing the first answer to the plurality of candidate answers indicates that the plurality of candidate answers are more semantically related to one another than to the first answer.

2. The method of claim 1, further comprising:

determining, by the first information handling system, if the plurality of candidate answers has gradient information; and updating, by the first information handling system, the answer key with the gradient information if not already included in the answer key.

3. The method of claim 1, further comprising:

sending, by the first information handling system, the first question to a second information handling system capable of answering questions; and receiving, from the second information handling system, the plurality of candidate answers generated in response to the first question.

4. The method of claim 3, where the first and second information handling systems comprise a natural language processing (NLP) computer system for running a search engine or querying a database with the first question to generate the plurality of candidate answers.

5. The method of claim 1, where comparing the first answer to the plurality of candidate answers comprises:

performing, by the first information handling system, a semantic analysis of the first answer and each candidate answer;

computing a plurality of first similarity metric values between said first answer and a respective candidate answer; and identifying a maximum similarity metric value from the plurality of first similarity metric values.

6. The method of claim 5, where comparing the first answer to the plurality of candidate answers comprises:

performing, by the first information handling system, a semantic analysis of each of the plurality of candidate answers; and computing a second similarity metric value for each pair of candidate answers quantifying said pair of candidate answers.

7. The method of claim 6, where comparing the first answer to the plurality of candidate answers comprises comparing one or more of the second similarity metric values to the maximum similarity metric value to identify a problem with the answer key if the maximum similarity metric value is less than the one or more of the second similarity metric values.

8. The method of claim 1, where comparing the first answer to the plurality of candidate answers comprises applying a lexical, syntactic, semantic, entropy, or ngram similarity metric.

9. The method of claim 1, further comprising comparing the plurality of candidate answers to one another by applying a lexical, syntactic, semantic, entropy, or ngram similarity metric.

10. An information handling system comprising:

one or more processors;

a memory coupled to at least one of the processors;

a set of instructions stored in the memory and executed by at least one of the processors to evaluate question-answer pairs in an answer key, wherein the set of instructions are executable to perform actions of:

selecting, by the system, a first answer from the answer key;

comparing, by the system, the first answer to a plurality of candidate answers generated in response to a first question corresponding to the first answer in the answer key by using a semantic analysis to determine if the plurality of candidate answers are semantically related to each other and are not related to the first answer from the answer key; and presenting, by the system, an indication that the answer key may have a problem if comparing the first answer to the plurality of candidate answers indicates that the plurality of candidate answers are more semantically related to one another than to the first answer.

11. The information handling system of claim 10, wherein the set of instructions are executable to determine if the plurality of candidate answers has gradient information and update the answer key with the gradient information if not already included in the answer key.

12. The information handling system of claim 10, wherein the set of instructions are executable to:

send the first question to a second information handling system capable of answering questions; and receive, from the second information handling system, the plurality of candidate answers generated in response to the first question.

13. The information handling system of claim 10, wherein the set of instructions are executable to compare the first answer to the plurality of candidate answers by:

performing a similarity analysis of the first answer and each candidate answer;

computing a plurality of first similarity metric values between said first answer and a respective candidate answer; and identifying a maximum similarity metric value from the plurality of first similarity metric values.

14. The information handling system of claim 13, wherein the set of instructions are executable to compare the first answer to the plurality of candidate answers by:

performing a similarity analysis of each of the plurality of candidate answers to one another; and computing a second similarity metric value for each pair of candidate answers quantifying said pair of candidate answers.

15. The information handling system of claim 14, wherein the set of instructions are executable to compare the first answer to the plurality of candidate answers by comparing one or more of the second similarity metric values to the maximum similarity metric value to identify a problem with the answer key if the maximum similarity metric value is less than the one or more of the second similarity metric values.

16. A non-transitory computer readable storage medium storing computer instructions that, when executed by an information handling system, causes the system to evaluate question-answer pairs in an answer key by:

selecting, by the system, a first answer from the answer key;

comparing the first answer to a plurality of candidate answers generated in response to a first question corresponding to the first answer in the answer key by using a semantic analysis to determine if the plurality of candidate answers are semantically related to each other and are not related to the first answer from the answer key; and presenting an indication that the answer key may have a problem if comparing the first answer to the plurality of candidate answers indicates that the plurality of candidate answers are more semantically related to one another than to the first answer.

17. The non-transitory computer readable storage medium of claim 16, further comprising computer instructions that, when executed by an information handling system, causes the system to:
   determine if the plurality of candidate answers has gradient information; and
   update the answer key with the gradient information if not already included in the answer key.

18. The non-transitory computer readable storage medium of claim 16, further comprising computer instructions that, when executed by an information handling system, causes the system to:
   send the first question to a second information handling system capable of answering questions; and
   receive, from the second information handling system, the plurality of candidate answers generated in response to the first question.

19. The non-transitory computer readable storage medium of claim 16, wherein comparing the first answer to a plurality of candidate answers comprises:
   performing a first similarity analysis of the first answer and each candidate answer;
   performing a second similarity analysis of the plurality of candidate answers to one another; and
   comparing the first similarity analysis to the second similarity analysis to determine if the plurality of candidate answers are more similar to one another than to the first answer.

20. The non-transitory computer readable storage medium of claim 19, where either or both of the first similarity analysis or the second similarity analysis comprises applying a lexical, syntactic, semantic, entropy, or ngram similarity metric.

* * * * *